June 2, 1936.  W. E. WINE  2,042,647
SPRING DEVICE
Filed May 3, 1934
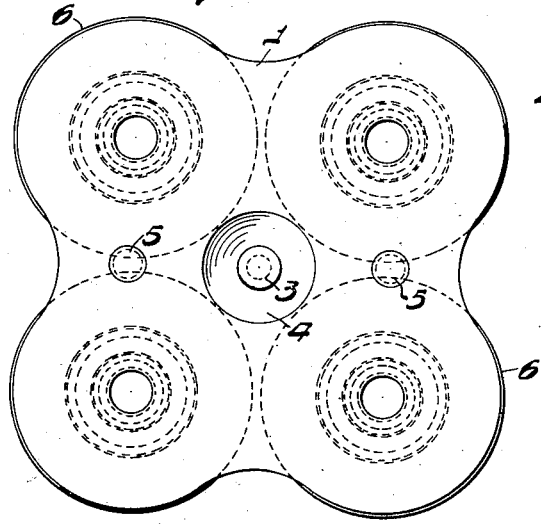
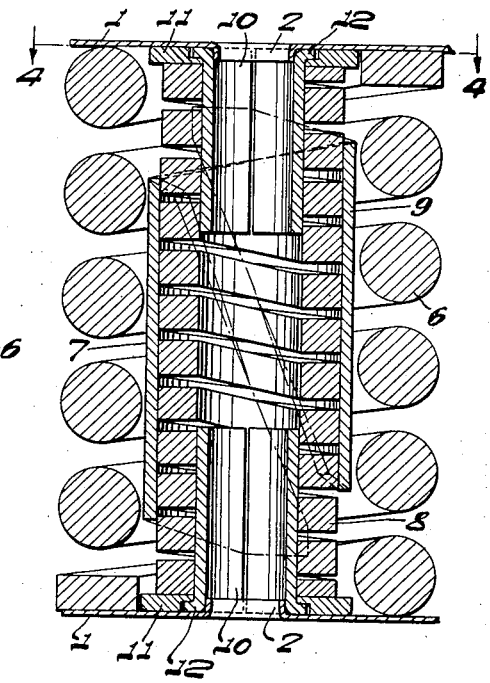
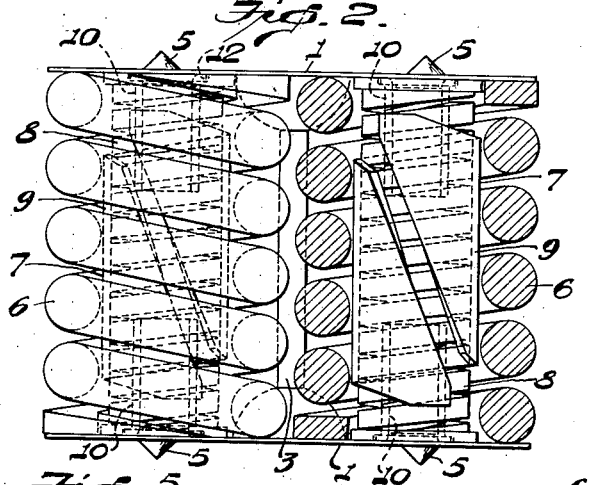
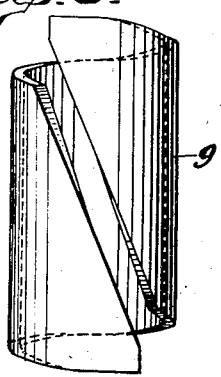
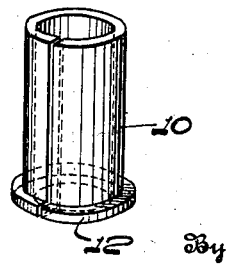
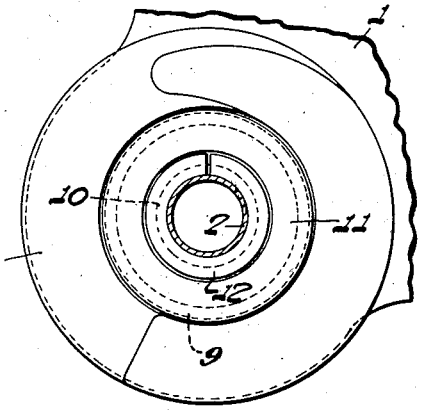
Inventor
William E. Wine
By Ritter & Meahlin
His Attorneys Patented June 2, 1936

2,042,647

UNITED STATES PATENT OFFICE 2,042,647

SPRING DEVICE

William E. Wine, Toledo, Ohio

Application May 3, 1934, Serial No. 723,748

10 Claims. (Cl. 267—9)

My invention relates to spring devices which, though capable of general application, are especially suitable for association with the side frames of railway car trucks to support the truck bolsters.

Heretofore it has been proposed, especially in connection with the spring assemblies of railway cars, to provide helical springs with friction producing means for dampening and increasing the capacity of the springs. These friction producing means have been usually arranged so as to engage the helical spring and it is with spring devices of this type that my invention is particularly concerned. In many spring devices of this character, the friction producing means only engages the helical spring for a portion of its length. Such devices have not proved satisfactory in service, because the convolutions of the spring which are not frictionally engaged, being on that account more resilient than the convolutions which are frictionally engaged, do considerable more work than the latter and, in fact, more work than they themselves would do if the friction producing means was eliminated entirely. This results in materially shortening the normal life of the spring. In some few of the spring devices heretofore devised, the friction producing means has been designed to engage the spring for substantially its entire length, but, in these cases, the means usually extends beyond the ends of the spring in all positions it assumes between its normal and fully compressed positions. This obviously is objectionable, as it entails providing special means for operating the spring in order to receive the friction producing means, when it projects beyond the ends of the spring.

The principal object of my invention is to provide a helical spring with friction producing means, which is engageable with the spring for substantially its entire length and does not project beyond the ends of the spring in any position the latter may assume.

Another object of the invention is to so form the helical spring and friction producing means that it may be shipped as a unit and that it may be inserted as a unit in place of the inner helical spring of a standard American Railway Association (hereinafter called A. R. A.) spring nest, which involves inner and outer helical springs.

A primary feature of the invention consists in providing a helical spring with friction producing means engageable with the spring for substantially its entire length, the means involving elements which are movable relatively to each other in opposite directions lengthwise of the spring and are respectively engageable with the inner and outer sides thereof.

Another feature of the invention consists in providing a helical spring with a pair of friction producing means respectively cooperating with the end portions thereof and with additional friction producing means cooperating with portions of the spring intermediate its end portions, said friction producing means being arranged to alternately engage opposite sides of the spring.

A further and more specific feature of the invention resides in providing a helical spring with relatively movable split sleeves which extend into and frictionally engage the end portions of the spring and with a longitudinally split sleeve encircling the spring and frictionally engaging portions intermediate the ends thereof.

A still further feature of the invention consists in providing the spring with seats respectively disposed adjacent its opposite ends, which are maintained in assembled relation with the spring by means frictionally engaging the latter.

Other and more specific features of the invention, residing in advantageous forms, combinations and relations of parts, will hereinafter appear and be pointed out in the claims.

In the drawing, illustrating a preferred embodiment of the invention,

Figure 1 is a plan view of a spring assembly especially suitable for application to truck side frames of railway cars.

Figure 2 is a side elevational view of the spring assembly, parts thereof being in section.

Figure 3 is an enlarged vertical sectional view of one of the spring nests of the spring assembly.

Figure 4 is a view taken on line 4—4 of Figure 3.

Figure 5 is a side elevational view of one of the friction producing members.

Figure 6 is a perspective view of another of the friction producing members.

Referring more particularly to the drawing, I designates the top and bottom spring caps of standard A. R. A. design, which are structurally identical. While the caps illustrated are adapted to receive between them four A. R. A. spring nests, the invention is, of course, not limited to a spring assembly having any particular number of spring nests. Each of the spring caps has a plurality of inwardly extending annular flanges 2 respectively adapted to extend within the adjacent ends of the spring nests for centering and restraining them from lateral movement with respect to the cap. The spring caps are usually connected by a centrally disposed bolt 3, which extends through openings formed in depressed portions 4 of the caps. To prevent lateral movement of the spring caps and consequently the spring assembly as a whole, the spring caps are formed with suitable outwardly extending projections 5 for respectively cooperating with portions of the side frame and truck bolster (not shown).

Each of the spring nests of the spring assembly comprises an outer helical spring 6, which may correspond in all details to the outer helical spring of the standard A. R. A. spring nest and a spring unit 7, which is disposed within the helical spring 6 in place of the inner helical spring of a standard spring nest.

The spring unit 7 involves a helical spring 8, which is preferably formed from a substantially square bar to provide the inner and outer sides of the spring with extended bearing surfaces of cylindrical form. Interposed between the helical springs 6 and 8 and encircling the latter in frictional engagement therewith is a longitudinally split sleeve 9, which is preferably compressible in the direction of its length. The sleeve may be formed in any convenient manner, such, for instance, by cylindrically coiling a metal plate and then longitudinally displacing its free ends in opposite directions. As made, the inside diameter of the split sleeve is smaller than the outside diameter of the helical spring 8, so that, when it is assembled with the spring by being circumferentially expanded, it will contract and thereby remain at all times in frictional engagement with the spring.

While it would be desirable to have the split sleeve of substantially the same free height as the helical spring 8, so that it will frictionally engage all convolutions of the latter, this is not possible for various reasons, the principal one being that, for the sleeve to travel a distance corresponding to the distance of travel of the helical spring, it would be considerably overstressed and thus quickly broken. Due to the frictional forces acting between the sleeve and helical spring, the sleeve will not, as may possibly be expected, move toward and remain at the lower end of the spring, but will center itself equidistant between the spring ends.

As the sleeve does not frictionally engage all convolutions of the spring, those which are not frictionally engaged, namely, the end convolutions, will flex more readily than those which are engaged and thus do more work. To prevent this and to subject all of the convolutions of the spring to friction producing forces, additional longitudinally split sleeves or bushings 10 are provided. These sleeves frictionally engage the spring on the side opposite the split sleeve 9, namely, the inner side and extend into the end portions of the spring a sufficient distance so as to be disposed in overlapping relation with the sleeve 9. The sleeves 10 are preferably identical and their normal outside diameters are somewhat larger than the inside diameter of the helical spring 8, so that, when they are inserted within the latter by being contracted, they will expand into frictional engagement with the inner surfaces of the convolutions adjacent the ends of the spring.

Interposed between the ends of the spring 8 and the respectively adjacent caps 1 are plates 11, preferably in the form of annuli, which afford seats for the spring. Each of the plates 11 is formed with a central opening of substantially the same diameter as the inside diameter of the helical spring 8 for receiving the outer end of the adjacent sleeve 10, which is suitably offset to provide an annular flange 12 adapted to extend into a recess formed in the outer face of the plate. By forming the sleeves 10 with offset portions overlapping the outer faces of the plates 11, it will be observed that the sleeves are prevented from moving toward each other, except when the spring is compressed. Moreover, by this means, the plates 11 are maintained in assembled relation with the spring. This is of no particular importance, after the unit 7 is assembled with the spring caps 1, but, before that time, such as when the unit is being shipped, it is of importance, since the plates may be retained in assembled position with the spring without the aid of any extraneous fastening means.

The outside diameter of the plates 11 is greater than the outside diameter of the helical spring 8, so as to project a limited distance laterally thereof. These laterally projecting portions of the plates afford abutments for the split sleeve 9 against which the latter contacts during closure of the spring unit. The laterally projecting portions of the plates 11 also prevent the sleeve from being accidentally displaced from around the spring 8 prior to the time the unit is mounted between the spring caps.

When the spring unit is assembled with the spring caps, it will be observed that the annular flanges 2 of the latter extend into the outer end portions of the split sleeves 10, thereby serving in their usual manner to restrain lateral displacement of the spring nest.

From the foregoing, it will be observed that, by providing a helical spring with friction producing means overlappingly engaging opposite sides thereof, all convolutions of the spring may be frictionally engaged and the friction producing means may be of such size that it will not project beyond the ends of the spring, when the latter is fully compressed. While the invention has been illustrated in connection with a spring assembly for railway cars, it is, of course, to be understood that the spring unit 7 is not of limited application, but may readily be adapted for use wherever helical springs are capable of functioning.

What I claim is:

1. A spring device involving a helical spring, and friction producing means engageable with said spring for substantially its entire length, said means including elements movable relatively to each other lengthwise of the spring and respectively engaging the inner and outer sides thereof, one of said elements being movable with one end of the spring and comprising a longitudinally split sleeve.

2. A spring device involving a helical spring, and friction producing means engageable with said spring for substantially its entire length, said means including elements respectively engaging the inner and outer sides of the spring and being relatively movable lengthwise of the spring, one of said elements comprising a longitudinally compressible sleeve.

3. A spring device involving a helical spring, a pair of yieldable friction producing means respectively cooperating with the end portions of the spring, and additional friction producing means cooperating with portions of the spring intermediate said end portions, said pair of friction producing means and said additional friction producing means respectively engaging opposite sides of the spring and serving as means for dampening the spring.

4. A spring device involving a helical spring, a pair of relatively movable members respectively disposed in frictional engagement with the end portions of the spring and a longitudinally compressible split sleeve frictionally engageable with portions of the spring intermediate said end portions, said pair of members and said sleeve being respectively disposed on opposite sides of the spring.

5. A spring device comprising a helical spring, relatively movable longitudinally split sleeves frictionally engaging the end portions of the spring, and a longitudinally split sleeve frictionally engaging portions of the spring intermediate said end portions, said sleeves being alternately arranged on opposite sides of the spring and constituting means frictionally engaging the spring for substantially its entire length in all operative positions the latter may assume.

6. A spring device involving a helical spring, a plurality of means respectively disposed at opposite ends of said spring for transmitting compressive forces thereto, yieldable friction producing members extending lengthwise of the spring normally tending to grip the end portions thereof and respectively movable with said means, and an additional friction producing member engageable with portions of the spring intermediate said end portions, one of said friction producing members engaging one side of the spring and others of said friction producing members engaging the opposite side of said spring.

7. A spring device involving a helical spring, a pair of friction producing means extending lengthwise of the spring respectively engageable with the end portions thereof, and members disposed at opposite ends of said spring through which compressive forces are transmitted thereto, each of said friction producing means having a laterally offset portion disposed in overlapping relation to the member adjacent thereto for maintaining the latter in operative association with the spring.

8. A spring device involving a helical spring, a pair of friction producing elements extending lengthwise within the spring and respectively engaging the end portions thereof, and members disposed at opposite ends of the spring through which compressive forces are transmitted thereto, the outer face of each of said members being recessed and said elements being provided with laterally offset portions respectively disposed in said recesses.

9. A spring device involving a helical spring, yieldable friction producing elements extending into said spring respectively adjacent the end portions thereof and normally tending to expand into engagement with said end portions, friction producing means encircling said spring for cooperating with portions intermediate said end portions, and members respectively disposed at opposite ends of the spring for transmitting compressive forces thereto, said members affording means limiting axial movement of said second named friction producing elements.

10. A spring device involving a helical spring, friction producing elements respectively engaging the inner side of said spring adjacent the ends thereof, a sleeve frictionally engaging the outer side of the spring, and members disposed at opposite ends of said spring affording seats for the latter and abutments for said sleeve, said friction producing elements normally gripping the interior of the spring and respectively serving to maintain said members in assembled relation with the spring.

WILLIAM E. WINE.